United States Patent [19]

Moulies et al.

[11] Patent Number: 5,393,832
[45] Date of Patent: Feb. 28, 1995

[54] EVOH/POLYPROPYLENE GAS-IMPERMEABLE POLYMER ALLOYS

[75] Inventors: Jean-Claude Moulies, Serquigny; Patrick Borg, Beaumont le Roger; Pierre Nogues, Bernay, all of France

[73] Assignee: Atochem, Puteaux, France

[21] Appl. No.: 979,429

[22] Filed: Nov. 19, 1992

Related U.S. Application Data

[63] Continuation of Ser. No. 580,650, Sep. 11, 1990, abandoned.

[30] Foreign Application Priority Data

Sep. 14, 1989 [FR] France .................................. 89 12041

[51] Int. Cl.⁶ .................... C08F 255/02; C08F 267/04; C08L 29/02
[52] U.S. Cl. ........................................ 525/57; 525/58; 525/283; 525/285
[58] Field of Search .................. 525/57, 283, 285, 58; 428/36.6

[56] References Cited

U.S. PATENT DOCUMENTS

| | | | |
|---|---|---|---|
| 4,822,688 | 4/1989 | Nogues | 525/285 |
| 4,879,341 | 11/1989 | Tsumiyama et al. | 525/425 |
| 4,957,974 | 9/1990 | Ilenda et al. | 525/57 |
| 4,977,212 | 12/1990 | Akazawa et al. | 525/285 |
| 5,160,475 | 11/1992 | Asano et al. | 525/183 |

FOREIGN PATENT DOCUMENTS

3909273  10/1989  Germany .

*Primary Examiner*—James J. Seidleck
*Assistant Examiner*—Thomas Hamilton, III
*Attorney, Agent, or Firm*—Burns, Doane, Swecker & Mathis

[57] ABSTRACT

Polymer alloys that can facilely be shaped into gas barrier, crack-resistant packaging materials, e.g., by thermoforming, include an ethylene-vinyl alcohol copolymer matrix, a polypropylene disperse phase and a phase-compatibilizing amount of an α-monoolefin graft copolymer.

7 Claims, 1 Drawing Sheet

EVOH/POLYPROPYLENE GAS-IMPERMEABLE POLYMER ALLOYS

This application is a continuation of application Ser. No. 07/580,650, filed Sep. 11, 1990, now abandoned.

BACKGROUND OF THE INVENTION

1. Field of the Invention

The present invention relates to novel polymer alloys comprising an ethylene-vinyl alcohol (EVOH) copolymer and a polypropylene (PP) and to the use of such novel alloys for the production of shaped articles having gas permeability properties and mechanical properties as to be suitable as packaging materials, for example monolayer or multilayer films, tubs, storage containers and the like.

The subject novel alloys are easily shaped employing techniques well known to this art, for example: extrusion coating, blow-extrusion, coextrusion, thermoforming, orientation and others.

2. Description of the Prior

The known packaging materials requiring very low gas permeability are produced from polymers having significant gas barrier properties.

Thus, EVOH is known to the art as an excellent barrier material from this standpoint, however, such copolymer presents a certain number of disadvantages, including its low processibility at high temperatures when compared with thermoplastic polymers such as polyethylene and polypropylene, typically employed in the field of packaging. It also has a rigidity and brittleness in the solid state which are such that, for example, when converted into film form, its gas permeability is not maintained when the film is subjected to repeated flexing, and cracking is a common result. In addition, its low processibility does not permit the material to withstand changes in geometry which are the usual in the processing of thermoplastics, such as orientation or thermoforming.

SUMMARY OF THE INVENTION

A major object of the present invention is the provision of improved polymer alloy packaging materials comprising an EVOH and a PP. These novel alloys comprise a major amount or matrix (dispersing phase) of EVOH; the PP is dispersed in such matrix in the form of more or less spherical nodules.

In accordance with this invention, adhesion between the respective phases is ensured by a graft copolymer based on an α-monoolefin, designated a compatibilizing agent, described in published French Patent Application No. 88/03,877 and having the formula:

$$A_aM_bX_cP_d$$

in which $A_aM_b$ represents the backbone (co)polymer; $X_cP_d$ represents the polymers grafted onto the backbone (co)polymer; A is a recurring structural unit derived from an α-monoolefin having from 2 to 8 carbon atoms and preferably a unit derived from propylene; M is a recurring structural unit derived from an α-monoolefin having from 2 to 8 carbon atoms, and preferably derived from ethylene, a recurring structural unit derived from a plurality of α-monoolefins such as defined above, which may be simply admixed or randomly or sequentially copolymerized, and in which one of the α-monoolefins is preferably ethylene, or a recurring structural unit derived from a monomer polymerizable with one of the α-monoolefins such as defined above, for example an alkyl acrylate; with the proviso that the units A and M comprising said backbone (co)polymer are copolymerized randomly or sequentially, or are simply mixed; X is a recurring structural unit derived from a monomer which can be grafted by a radical mechanism onto an α-monoolefin homo- or copolymer and which comprises a functional group reactable with an amine; P is derived from a polyamide oligomer having the formula:

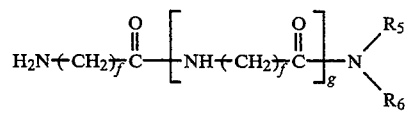

in which f is a number ranging from 3 to 11; g is a number ranging from 3 to 80 and preferably from 15 to 55; $R_5$ is hydrogen or a linear or branched chain alkyl radical having up to 20 carbon atoms; and $R_6$ is a linear or branched chain alkyl or alkenyl radical having up to 20 carbon atoms, a saturated or unsaturated cycloaliphatic radical, an aromatic radical, or a combination thereof; a, b, c and d are numbers such that a has a value ranging from 0 to 5,000 and preferably from 350 to 2,000, the sum a+b ranges from 350 to 45,000 and preferably from 500 to 10,000, c has a value such that the weight content of the unit grafted onto the backbone (co) polymer relative to the copolymer grafted with X ranges from 500 ppm to 10%, preferably less than 2% and more preferably ranges from 5,000 ppm to 1.5%, and d is greater than 0 and less than or equal to c, and preferably is at least equal to 0.3.

DETAILED DESCRIPTION OF THE PREFERRED EMBODIMENTS OF THE INVENTION

Figure 1:
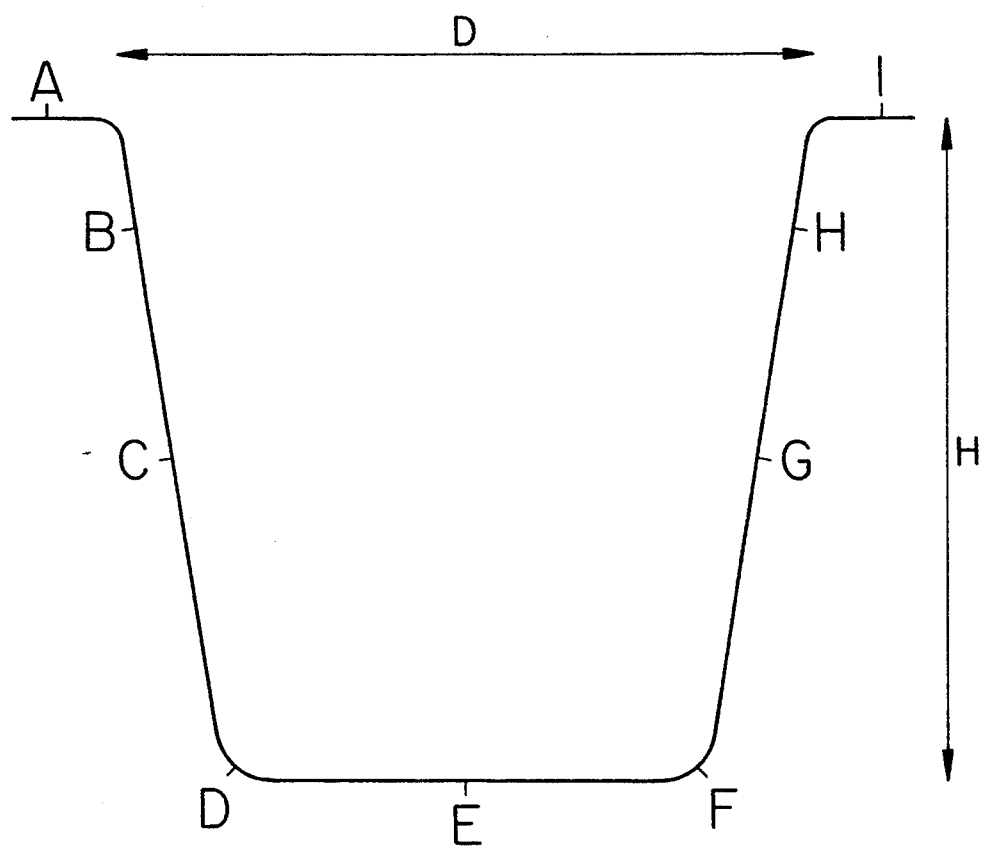
FIG. 1 illustrates the total thickness of a gas barrier material measured at different points as described in the examples below.

More particularly according to the present invention, the backbone (co)polymer of formula $A_aM_b$, in which a, b, A and M are as defined above, is intended to comprehend any copolymer comprised of A and M recurring units, which are derived from monomers polymerized randomly or sequentially or, optionally, any mixture of polymers prepared by separate polymerizations of monomers from which the units A and M are derived.

This copolymerization, or this mixing, can be carried out according to known processes. The copolymerization of propylene and of α-olefin in the presence of a Ziegler or coordination catalyst is exemplary.

The monomer comprising the unit X advantageously has one of the following formulae:

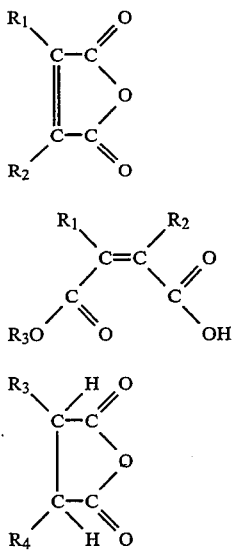

in which $R_1$ and $R_2$ are either hydrogen or a linear or branched chain alkyl chain having up to 8 carbon atoms, at least one of $R_1$ or $R_2$ being hydrogen, $R_3$ is hydrogen or a linear or branched chain alkyl group having up to 10 carbon atoms, and $R_4$ is a linear or branched chain alkenyl radical having up to 12 carbon atoms.

The preferred monomers comprising the unit X are citraconic anhydride, fumaric acid, mesaconic acid, the anhydride of 3-allylsuccinic acid and, more preferably, maleic anhydride.

EVOH is a copolymer consisting essentially of ethylene and vinyl alcohol recurring units and may comprise minor amounts of other monomer recurring units, in particular vinyl ester recurring units. These copolymers can be prepared by complete or total alcoholysis or saponification of ethylene-vinyl ester copolymers. Among the vinyl esters, vinyl acetate is the preferred monomer. The degree of saponification or of alcoholysis is at least equal to 90% on a molar basis and preferably ranges from 54% to 99.5%. The proportion of ethylene in the EVOH, on a molar basis, ranges from 3% to 75% and preferably from 10% to 50%.

Polypropylene is a polymer consisting essentially of propylene recurring units. It may comprise minor amounts, at most 40 mol %, of another monomer recurring unit, in particular ethylene and/or one or more α-olefin(s) having from 4 to 6 carbon atoms. That preferably employed is a homopolypropylene or a block copolymer of propylene with 0.5% to 30 mol % of ethylene, or a random copolymer of propylene and ethylene comprising 0.1% to 30 mol % of ethylene.

To the three principal constituents, i.e., EVOH, polypropylene and the compatibilizing agent, may optionally be added minor amounts of other compounds, additives or adjuvants of the stabilizer, antistatic agent, lubricant or plasticizer type, etc., and/or other polymers.

Since the constituents are in the form of powder or of granules, the preparation of the alloy is carried out in the molten state, typically by blending using processing conversion apparatus of the extruder type with a single screw, or with two counter- or corotating screws, or of roll mill type.

The alloys of the present invention have, in particular, a very low gas permeability; they exhibit better drawdown properties during conversion than the EVOH used to prepared the alloy, for example in respect of thermoforming. In addition, for applications of coextrusion type, the adhesion between the adhesive polymer and gas barrier material layers is markedly improved when an alloy according to the invention is employed. The cracking resistance of the subject alloys, on repeated flexing, is considerably improved in comparison with that of the EVOH used to prepare the alloy.

The proportions of the three principal constituents of the alloy are preferably within the following ranges:

| EVOH: | 42.5 to 99.5 weight % |
| --- | --- |
| Polypropylene: | 42.5 to 0.4 weight % |
| Compatibilizing agent: | 0.1 to 15.0 weight %. |

The other optional constituents do not constitute more than 20 parts by weight per 80 parts by weight of the alloy.

In order to further illustrate the present invention and the advantages thereof, the following specific example is given, it being understood that same is intended only as illustrative and in nowise limitative.

EXAMPLE

Function of the compatibilizing agent and morphology of the alloys:

Five compositions were produced using a corotating twin-screw extruder with the proportions of the three constituents EVOH: ethylene-hydrolyzed vinyl acetate copolymer containing 32 mol % of ethylene having a melt index (MI) of 3.2 g/10 minutes measured at 210° C. under 2.16 kg, PP: ethylene-propylene random copolymer containing 3% by weight of ethylene having an MI of 2 g/10 minutes measured at 230° C. under 2.16 kg, compatibilizing agent: graft copolymer, nature of which reported in Table I.

These compositions were then extruded in the form of 20-μm thick films using a single-screw extruder. These films were examined by scanning electron microscopy (SEM) after cryogenic fracture.

Because of the orientation due to the film extrusion, the disperse phase was in the form of small rods oriented in the direction of extrusion; the size of the small rods was measured on the fractures after dissolving the disperse phase in xylene.

The assessment of the adhesion between phases was performed qualitatively on the fractures.

Compatibilizing agents:

These were graft copolymers represented by the formula AaMbXcPd wherein:

A was a structural unit derived from propylene;
M was a structural unit derived from ethylene;
X was a structural unit derived from maleic anhydride;
P1 was a caprolactam oligomer having a molecular weight of 2,700 determined by potentiometric determination of the terminal amine functional groups.

TABLE I

| TESTS | ALLOY COMPOSITION (% by weight) | | COMPATIBILIZING AGENT | SEM INSPECTION OF THE ALLOY AS A 20-μm THICK FILM |
|---|---|---|---|---|
| | EVOH | PP | | |
| 1 comp. | 85 | 15 | 0 | The PP was distributed in the EVOH matrix in the form of small cylindrical rods from 0.7 to 5 μm in cross-section. No adhesion between phases. |
| 2 comp. | 80.75 | 14.25 | $A_{663}M_{136}X_{0.65}$: 4 EVOH containing 29 mol % of ethylene: 1 | The PP was distributed in the EVOH matrix in the form of small cylindrical rods from 0.5 to 3 μm in cross-section. A weak adhesion existed between phases. |
| 3 | 80.75 | 14.25 | $A_{663}M_{136}X_{2.91}P_{0.87}$: 5 | The PP was distributed in the EVOH matrix in the form of small cylindrical rods from 0.1 to 2 μm in cross section. A strong adhesion existed between phases. |
| 4 | 85.5 | 9.5 | $A_{663}M_{136}X_{2.91}P_{0.87}$: 5 | The PP was distributed in the EVOH matrix in the form of small cylindrical rods from 0.05 to 1.5 μm in cross-section. A strong adhesion existed between phases. |
| 5 | 9.5 | 85.5 | $A_{663}M_{136}X_{2.91}P_{0.87}$: 5 | The EVOH was distributed in the PP matrix in the form of small cylindrical rods from 0.1 to 2 μm in cross-section. A strong adhesion existed between phases. |

It appears that the absence of a compatibilizing agent resulted in a coarse dispersion of the PP in the EVOH. The use of the compatibilizing agent $A_{663}M_{136}X_{2.91}P_{0.87}$ produced a better dispersion of the PP in the EVOH than that of the simple maleized PP $A_{663}M_{136}X_{0.65}$. In addition, the adhesion between phases was better with the compatibilizing agent $A_{663}M_{136}X_{2.91}P_{0.87}$ than with $A_{663}M_{136}X_{0.65}$.

In all cases, the alloys had an EVOH matrix, except for Test 5, which had a PP matrix because the portion of PP in this test was high.

Oxygen permeability of thin films:

Films were prepared from the two EVOHs and from the three alloys described in Tests 3, 4 and 5, by extrusion. The oxygen permeability of these films was measured according to ASTM standard D 398581.

Film thickness: 20 μm.

| TESTS | Nature of the material | Oxygen permeability cc × 20 μm/m² × day × atm |
|---|---|---|
| | FILMS OBTAINED BY BLOWING | |
| | | 0% relative humidity 20° C. |
| 6 | EVOH containing 44 mol % of ethylene MI:3.5 g/10 min (210° C. - 2.16 kg) | 1.20 |
| 7 | EVOH containing 32 mol % of ethylene MI:3.2 g/10 min (210° C. - 2.16 kg) | 0.2 |
| 8 | Alloy from Test 3 | 0.3 |
| | FILMS OBTAINED BY EXTRUSION CASTING | |
| | | 75% relative humidity 25° C. |
| 9 | Alloy from Test 4 | 2 |
| 10 | Alloy from Test 5 | 2,760 |

It appears that, at equal thicknesses, the alloy from Test 8 exhibited a permeability approximately that of the EVOH copolymer rich in vinyl alcohol recurring units and better than that of the copolymer having a lower content of vinyl alcohol recurring units: Tests 6 and 7.

Moreover, for the oxygen permeability to be low, the alloy must be prepared with an EVOH matrix and a polypropylene disperse phase: Tests 9 and 10.

Coextrusion:

A three-layer sheet having the following structure was produced by coextrusion:
(i) PP (ethylene-propylene random copolymer containing 3% of ethylene): thickness 0.7 mm;
(ii) Orevac ® PP FT coextrusion binder (ethylene-propylene copolymer with 1,500 ppm of grafted maleic anhydride): thickness 0.1 mm;
(iii) Gas barrier material (pure EVOH or alloy having the composition reported in Table II): thickness 0.2 mm.

These tests were carried out using a machine for coextrusion of three-layer sheets:
(a) Extruder 60 mm diameter—28 D: PP
    Temperature: 200°-210°-220°-230° C.
    Screw speed: 40 rev/min;
(b) Extruder 45 mm diameter—20 D: gas barrier material Temperature: 210°-220°-230°-230° C.
Screw speed: 14 rev/min;
(c) Extruder 30 mm diameter—22 D: binder
Temperature: 195°-200°-210°-210° C.
Screw speed: 40 rev/min;
(d) Die: multichannel three-layer
Width 400 mm—gap: 1.2 mm
Temperature: 6×230° C.;
(e) Polishing rolls: temperature: 55°-90°-90° C.
Gap: 0.95 mm
Take-up speed: 1.12 m/min.

The adhesiveness between the layers of binder and of gas barrier material was measured by a peeling test at 200 mm/minute. The results are reported in Table II which follows:

TABLE II

| Tests | Nature of the gas barrier material | ADHESION IN G/CM Average value | Range |
|---|---|---|---|
| 11 | *EVOH | 2900 | 2600–3300 |
| 12 | **EVOH | 2900 | 2850–3000 |
| 13 | ***Alloy | 3900 | 3800–4000 |

*EVOH containing 44 mol % of ethylene - MI 210° C. 2.16 kg: 3.5
**EVOH containing 32 mol % of ethylene - MI 210° C. 2.16 kg: 3.2
***Alloy composition by weight:

(i) EVOH containing 32 mol % of ethylene (MI 210° C.—2.16 kg: 3.2): 80.75%;
(ii) PP ethylene-propylene random copolymer containing 3% of ethylene (MI 230° C.—2.16 kg: 10): 14.25%;
(iii) Compatibilizing agent: $A_{663}M_{136}X_{2.91}P_{0.87}$: 5%.

Thermoforming:

The three-layer sheets prepared by coextrusion, as described above, were thermoformed under the following conditions:
Conditions common to all tests:
Upper oven heating: 80° C.;
Lower oven heating: 100° C.;
Frame heating: 80° C.;
Mold cycle time: 15 seconds;
Punch temperature: 140° C.;
Heating time: 25 seconds (in all cases, whatever the height/diameter ratio);
Tests carried out with the EVOH side downwards (=cup exterior).

Thickness measurements:

The total thickness and the thickness of the gas barrier material were measured at different points as shown in the attached Figures of Drawing.

The thermoforming ratio was: H/D=0.95

The thickness measurements are reported in Table III.

TABLE III

| | Tests | | | | | |
|---|---|---|---|---|---|---|
| | 14 | | 15 | | 16 | |
| | Nature of the gas barrier material | | | | | |
| | EVOH containing 44 mol % of ethylene | | EVOH containing 32 mol % of ethylene | | Test 13 alloy | |
| Measurement point | Total thickness (μm) | EVOH thickness/ Total thickness | Total thickness (μm) | EVOH thickness/ Total thickness | Total thickness (μm) | EVOH thickness/ Total thickness |
| A | 1090 | 0.22 | delimitation | | 1050 | 0.25 |
| B | 300 | 0.33 | of the layers | | 410 | 0.22 |
| C | 270 | 0.14 | thermoforming | | 260 | 0.23 |
| D | 175 | 0.17 | is impossible | | 530 | 0.21 |
| E | 620 | 0.21 | | | 570 | 0.25 |
| F | 500 | 0.18 | | | 185 | 0.27 |
| G | 510 | 0.18 | | | 180 | 0.33 |
| H | 410 | 0.29 | | | 460 | 0.22 |
| I | 1090 | 0.23 | | | 1050 | 0.22 |
| Mean | | 0.22 | | | Mean | 0.24 |
| Max. | | 0.33 | | | Max. | 0.33 |
| Min. | | 0.14 | | | Min. | 0.21 |

In the case of EVOH containing 32 mol % of ethylene, the rigidity did not permit thermoforming to be carried out under the given conditions.

In the case of EVOH containing 44 mol % of ethylene, in which the vinyl alcohol unit content was lower than in the case of the preceding EVOH, thermoforming was carried out and the proportion of the EVOH layer relative to the total thickness was maintained: 0.22 instead of 0.20 in the initial sheet, but the thickness of the EVOH layer was not uniform, in particular at the point C, in which case the minimum thickness, 0.14 of the total thickness, was measured.

In the case of the alloy from Test 13, the lowest thickness was measured at point D with 0.21 of the total thickness.

Figure 2:
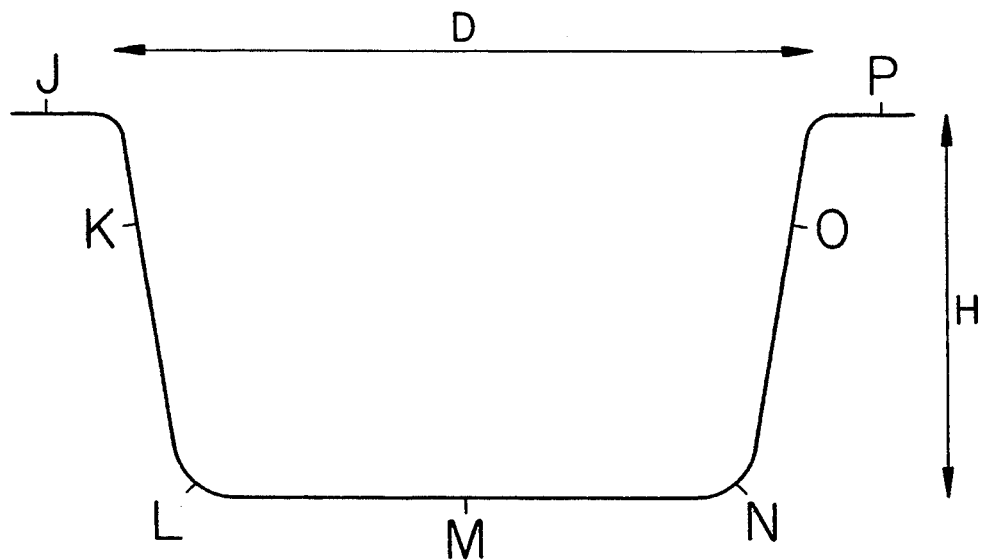
FIG. 2 illustrates the total thickness of a gas barrier material measured at different points as described in the examples below.

Thermoformings shown in FIG. 2, having an H/D ratio=0.55 were produced from the three-layer sheets obtained previously.

The thickness measurements are reported in Table IV below:

TABLE IV

| | Tests | | | | | |
|---|---|---|---|---|---|---|
| | 17 | | 18 | | 19 | |
| | Nature of the gas barrier material | | | | | |
| | EVOH containing 44 mol % of ethylene | | EVOH containing 32 mol % of ethylene | | Test 13 alloy | |
| Measurement point | Total thickness (μm) | EVOH thickness/ Total thickness | Total thickness (μm) | EVOH thickness/ Total thickness | Total thickness (μm) | EVOH thickness/ Total thickness |
| J | 1080 | 0.20 | delimitation of the layers thermoforming is impossible | | 1050 | 0.20 |
| K | 400 | 0.20 | | | 480 | 0.21 |
| L | 140 | 0.71 | | | 150 | 0.33 |
| M | 230 | 0.65 | | | 370 | 0.24 |
| N | 570 | 0.12 | | | 475 | 0.23 |
| O | 710 | 0.17 | | | 660 | 0.20 |
| P | 1070 | 0.20 | | | 1060 | 0.20 |
| | Mean | 0.32 | | | Mean | 0.23 |
| | Max. | 0.71 | | | Max. | 0.33 |
| | Min. | 0.12 | | | Min. | 0.20 |

The rigidity of the EVOH containing 32 mol % of ethylene did not permit thermoforming to be carried out.

In the case of EVOH containing 44 mol % of ethylene, the thickness of the barrier layer was minimal at point N: 0.12 of the total thickness, whereas in the case of the alloy the minimum was attained at points J, O and P: 0.20 of the total thickness.

The oxygen permeability of the cups produced in Tests 18 and 19 employing EVOH containing 32 mol % of ethylene and the alloy as gas barrier material, respectively, was measured. In addition, a cup of the same size, produced from PP (ethylene-propylene random copolymer containing 3% of ethylene) was evaluated for oxygen permeability by way of comparison.

The results obtained were as follows: ($P_{O2}$=gas permeability):

(a) Three-layer cup (EVOH containing 32 mol % of ethylene) $P_{O2}$ > 10 cc $O_2$/day;

(b) Three-layer cup (alloy from Test 13) $P_{O2}$ = 0.03 cc $O_2$/day;

(c) Single-layer cup (ethylene-propylene random copolymer containing 3% of ethylene) $P_{O2}$ = 0.53 cc $O_2$/day.

Flexural fatigue resistance:

The cracking resistance of the films subjected to repeated flexing was evaluated by means of the apparatus described in FED Test Method Standard 101B, Method LO17.

The test entailed deforming a 0.28 m × 0.19 m film 20 μm in thickness arranged beforehand in the form of a cylinder on the support of the apparatus under the following conditions:

Method 1 (20° C.—Dry film):

Displacement along the axis of the cylinder over 0.089 m with a simultaneous rotational movement of 440 degrees, followed by a sideways displacement of 0.063 m and reverse movement; which represented 1 cycle.

Method 2 (20° C.—Dry film):

Displacement along the axis of the cylinder over 0.083 m with a simultaneous rotational movement of 400 degrees and reverse movement, which represented one cycle.

When applied to films constituted of EVOH containing 32 mol % of ethylene and of alloy identical with that of Test 13, these tests provided the following results:

| | | NUMBER OF HOLES | | | | |
|---|---|---|---|---|---|---|
| | NATURE OF | METHOD 1 | | METHOD 2 | | |
| TESTS | THE GAS BARRIER MATERIAL | 100 cycles | 200 cycles | 100 cycles | 500 cycles | 800 cycles |
| 20 | EVOH containing 32 mol % of ethylene | 146 | 261 | 33.2 | 169 | 210 |
| 21 | Alloy from Test 13 | 0 | 5.6 | 0 | 3.2 | 19 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A gas barrier polymer alloy composition comprising (i) an ethylene-vinyl alcohol copolymer matrix, (ii) a polypropylene disperse phase, and (iii) a phase-compatibilizing amount of an α-monoolefin graft copolymer, said α-monoolefin graft copolymer having the formula:

AaMbXcPd in which AaMb represents the backbone (co)polymer; XcPd represents the polymers grafted onto the backbone (co)polymer; A is a recurring structural unit derived from an α-monoolefin having from 2 to 8 carbon atoms; M is a recurring structural unit derived from α-monoolefin having from 2 to 8 carbon atoms, a recurring structural unit derived from a plurality of such α-monoolefins, either admixed or randomly or sequentially copolymerized, or a recurring structural unit derived from a monomer polymerizable with such α-monoolefins; with the proviso that the units A and M comprising said backbone (co) polymer are copolymerized randomly or sequentially, or are only admixed; X is a recurring structural unit derived from a monomer which can be grafted onto an α-monoolefin homo- or copolymer and which comprises a functional group reactable with an amine; P is derived from a polyamide oligomer having the formula:

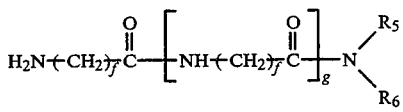

in which f is a number ranging from 3 to 11; g is a number ranging from 3 to 80; $R_5$ is hydrogen or a linear or branched chain alkyl radical having up to 20 carbon atoms; and $R_6$ is a linear or branched chain alkyl or alkenyl radical having up to 20 carbon atoms, a saturated or unsaturated cycloaliphatic radical, an aromatic radical, or a combination thereof; a, b, c and d are numbers such that a has a value ranging from 0 to 5,000, the sum a+b ranges from 350 to 45,000, c has a value such that the weight content of the unit grafted onto the backbone (co)polymer relative to the copolymer grafted with X ranges from 500 ppm to 10%, and d is greater than 0 and less than or equal to c.

2. The polymer alloy composition as defined by claim 1, comprising from 42.5% to 99.5% by weight of said ethylene-vinyl alcohol copolymer matrix, from 42.5% to 0.4% by weight of said polypropylene disperse phase, and from 0.1% to 15.0% by weight of said phase-compatibilizing α-monolefin graft copolymer.

3. The polymer alloy composition as defined by claim 1, said polypropylene disperse phase comprising essentially spherical nodules.

4. A shaped article comprising the polymer alloy composition as defined by claim 1.

5. The shaped article as defined by claim 4, comprising a film or container.

6. A packaging material comprising a gas barrier polymer alloy composition, wherein said gas barrier polymer alloy composition of said packaging material comprises (i) an ethylene-vinyl alcohol copolymer matrix, (ii) a polypropylene disperse phase, and (iii) a phase compatibilizing amount of an α-monoolefin graft copolymer, said α-monoolefin graft copolymer having the formula:

AaMbXcPd in which AaMb represents the backbone (co)polymer; XcPd represents the polymers grafted onto the backbone (co)polymer; A is a recurring structural unit derived from an α-monoolefin having from 2 to 8 carbon atoms; M is a recurring structural unit derived from α-monoolefin having from 2 to 8 carbon atoms, a recurring structural unit derived from a plurality of such α-monoolefins, either admixed or randomly or sequentially copolymerized, or a recurring structural unit derived from a monomer polymerizable with such α-monoolefins; with the proviso that the units A and M comprising said backbone (co)polymer are copolymerized randomly or sequentially, or are only admixed; X is a recurring structural unit derived from a monomer which can be grafted onto an α-monoolefin homo- or copolymer and which comprises a functional group reactable with an amine; P is derived from a polyamide oligomer having the formula:

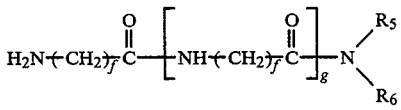

in which f is a number ranging from 3 to 11; g is a number ranging from 3 to 80; $R_5$ is hydrogen or a linear or branched chain alkyl radical having up to 20 carbon atoms; and $R_6$ is a linear or branched chain alkyl or alkenyl radical having up to 20 carbon atoms, a saturated or unsaturated cycloaliphatic radical, an aromatic radical, or a combination thereof; a, b, c and d are numbers such that has a value ranging from 0 to 5,000, the sum a+b ranges from 350 to 45,000, c has a value such that the weight content of the unit grafted onto the backbone (co)polymer relative to the copolymer grafted with X ranges from 500 ppm to 10%, and d is greater than 0 and less than or equal to c.

7. The packaging material as defined by claim 6, wherein said α-monoolefin graft copolymer contains a polyamide oligomer graft on the polymer backbone.

* * * * *